Oct. 22, 1940.  J. W. LOGAN, JR  2,218,613
BRAKE SYSTEM
Filed Dec. 30, 1939   2 Sheets-Sheet 1
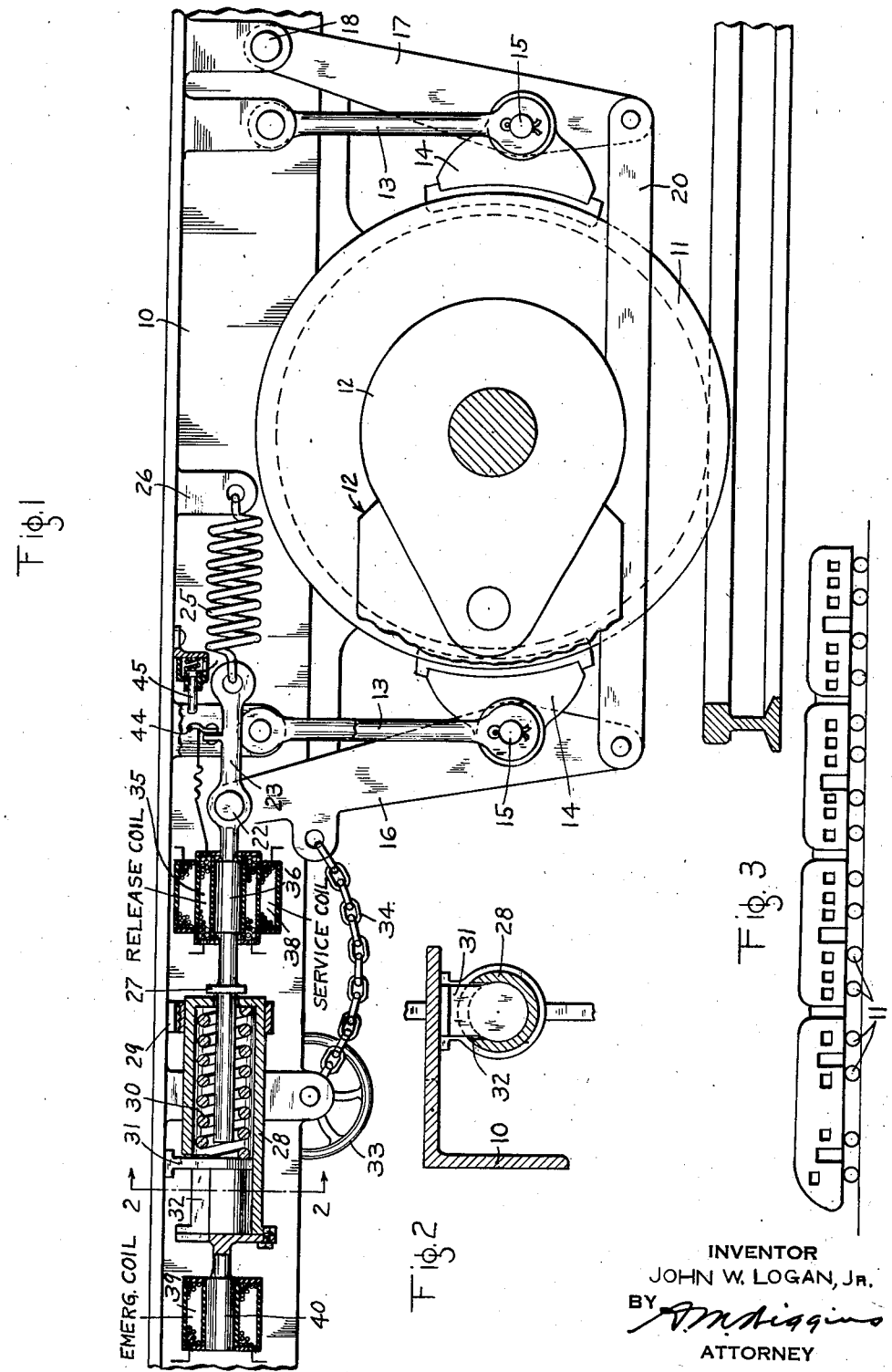
INVENTOR
JOHN W. LOGAN, JR.
BY
ATTORNEY

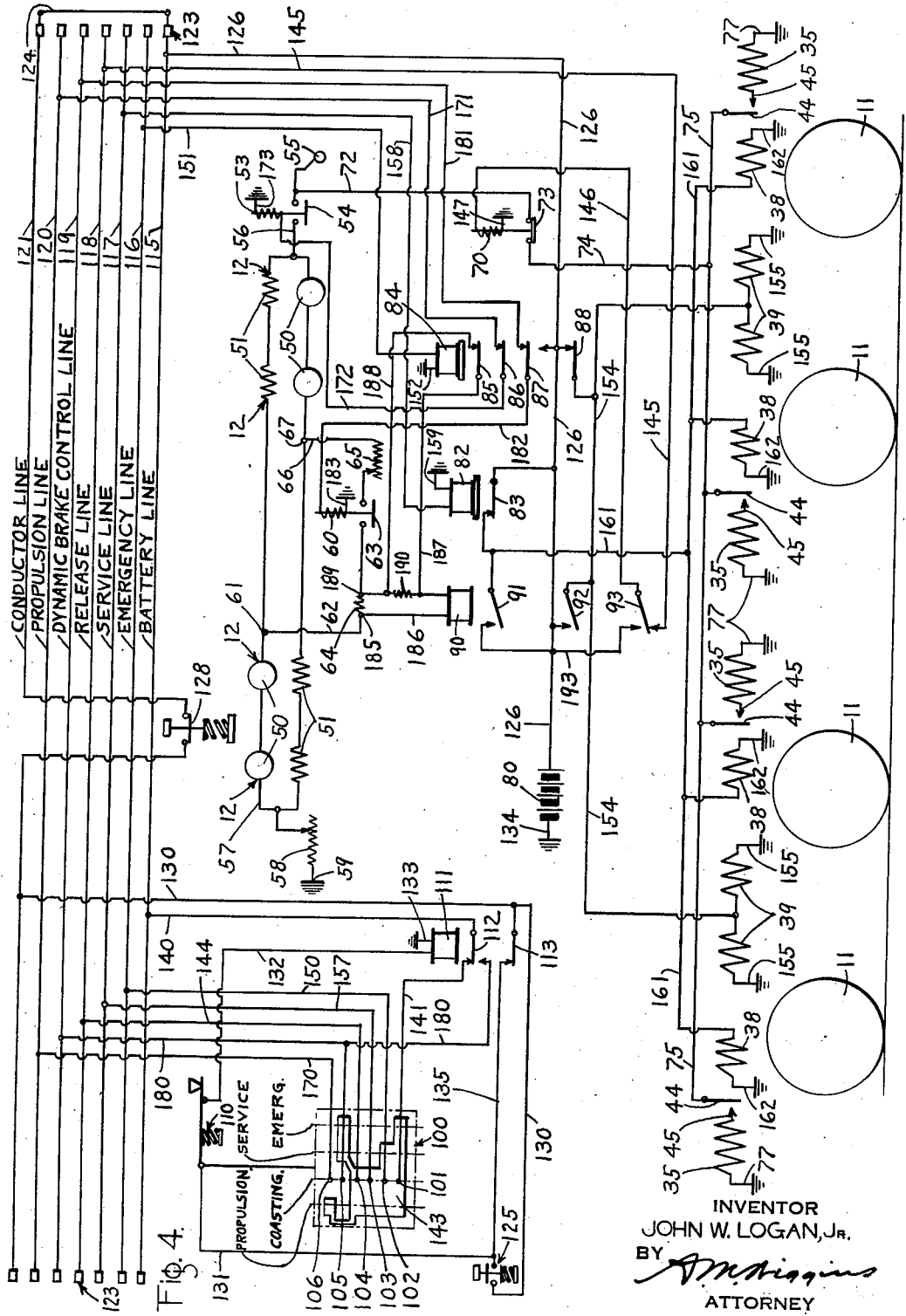

Patented Oct. 22, 1940

2,218,613

UNITED STATES PATENT OFFICE 2,218,613

BRAKE SYSTEM

John W. Logan, Jr., Forest Hills, Pa., assignor to The Westinghouse Air Brake Company, Wilmerding, Pa., a corporation of Pennsylvania Application December 30, 1939, Serial No. 311,806

11 Claims. (Cl. 188—2)

This invention relates to vehicle brake systems of the class embodying an electrodynamic brake combined with a friction brake, and more particularly to control apparatus for such a brake system including interlock means coacting with the dynamic brake and the friction brake.

In my United States Patent 1,991,903, issued February 19, 1935 and assigned to the assignee of the present invention, there is disclosed a dual braking system comprising an electrodynamic brake of the eddy current type and a spring brake mechanism, together with interlocking control means therefor, wherein the features of invention include means for withholding the application of the spring brake until the electric brake effect fades to one value during service braking and to a higher value during emergency braking, and means for effecting selective operation of the spring brake mechanism to provide either a service braking force or an emergency braking force.

The principal object of the present invention is to provide an improved brake system of the combined electro-dynamic and friction interlocked type, which includes the desirable features embodied in the braking system disclosed in the above patent, and which may be used for controlling either a single vehicle or a multiple unit train employing dynamic brakes, rather than eddy current brakes.

Another object of the invention is to provide a dual brake system of the above type comprising dynamic brake means, spring actuated clasp brake means, and electrically actuated interlock means for controlling both the dynamic and friction brake means.

Other objects and advantages of the invention will appear in the following more detailed description thereof, taken in conjunction with the accompanying drawings, in which Fig. 1 is a schematic fragmentary view of a vehicle truck, including one of the motor driven axles thereof and the associated braking means constructed in accordance with the invention;

Fig. 2 is a sectional view taken on the line 2—2 of Fig. 1;

Fig. 3 is a reduced scale view illustrating a multiple unit train of the type for which my improved brake system is primarily designed; and Fig. 4 is a diagrammatic view of the dual brake controlling apparatus and electric circuits therefor as applied to one vehicle of a train.

Referring to Fig. 1 of the drawings, there is illustrated a portion of a railway truck including a truck frame 10 and a motor driven wheel and axle assembly 11 having associated therewith a simplified brake apparatus embodying features of the invention, it being understood that each vehicle in a multiple unit train like that shown in Fig. 3 may be provided with four or more such braking equipments. As shown in Fig. 1, the wheel and axle assembly 11 is adapted to be driven by a motor 12 which is mounted on or in operative relation with the axle, and is operative at times as a dynamic brake as hereinafter explained. Suspended from the truck frame 10 by means of brake hanger members 13 are a pair of brake shoe elements 14, which are pivotally connected to the respective hanger members and levers 16 and 17 by means of pins 15. The brake lever 17 is pivotally connected to a stationary pin 18 carried by the truck frame, and is also operatively connected to the brake lever 16 through the medium of a tie rod 20, the ends of which are pivotally connected to the lowermost portions of both brake levers. The brake shoe elements 14 are thus adapted to be operated into clasp braking relation with the associated wheel 11 when the upper end of the brake lever 16 is forced to the right as hereinafter explained.

According to the invention as illustrated in Fig. 1, the upper end of the brake lever 16 carries a pin 22 that is pivotally connected to a brake rod 23, one end of which is connected to a retractile service spring 25 anchored on a lug 26 formed on the truck frame, and the opposite end of which carries a collar 27 and extends through an aperture in a spring casing 28, which is slidably supported by a bracket 29 formed on the frame. The brake rod 23 is disposed longitudinally of the truck frame 10 and is adapted to be operated under the force of the service spring 25 for effecting application of the brake shoes 14 to the wheel with service braking force as hereinafter explained.

The spring casing 28 is hollow and has mounted therein an emergency spring 30, which is interposed between the end of the casing adjacent the collar 27 of the brake rod and a stationary spring seat element 31 carried by the truck frame 10. As shown in Fig. 2, the element 31 projects through an aperture 32 in the casing 28. The emergency spring 30 is adapted to exert a greater force than that exerted by the service spring 25, and under emergency braking conditions, as hereinafter explained, is operative together with the service spring for effecting an emergency application of the brakes. A ratcheted hand wheel 33 is provided for enabling manual release of the friction brakes against the combined forces of the service spring 25 and emergency spring 30, the hand wheel being mounted on the truck frame 10 and operative to wind up a chain 34 which is connected to the upper end of the brake lever 16.

Under normal operating conditions, however, the service and emergency springs 25 and 30, and the associated elements of the friction brake mechanism just described, are adapted to be operated to and held in release position upon energization of electromagnetic means mounted on the truck frame 10, comprising a release coil 35 surrounding an enlarged soft iron core portion 36 of the brake rod 23, a service coil 38 which may be mounted on the release coil and in magnetic relation with the core portion 36, and an emergency coil 39, which is adapted to receive a soft iron core portion 40 formed on the end of the spring casing 28. As will hereinafter be explained, the release coil 35 is adapted to be energized by current supplied from the usual third rail or trolley and exerts sufficient force on the core portion 36 to move the brake rod 23 to release position against combined forces of the springs 25 and 30. The service coil 38 and emergency coil 39 are adapted to be energized by current supplied from an auxiliary battery, to be described, and exert sufficient force on the respective cores 36 and 40 to maintain the service spring 25 and emergency spring 30 in their retracted or release positions, after the release coil has been energized.

As will be explained later in connection with Fig. 4 of the drawings, the release coil 35 is energized through a circuit including a cut-out switch which may comprise a suitably insulated contact member 44 carried by the brake rod 23, and a spring-pressed contact member 45 mounted on the frame 10, which contact members are adapted to be disconnected when the brake rod is moved to release position as shown in Fig. 1.

As shown in Fig. 4 of the drawings, in which a preferred embodiment of my improved brake system is shown in diagrammatic form, four driving motors are provided for operating the respective wheel and axle assemblies 11 of a vehicle adapted for train service, it being understood that each of the wheel and axle assemblies 11 shown in Fig. 4 is provided with friction brake means such as that shown in Fig. 1, including three brake controlling magnets or holding coils 35, 38 and 39.

The motors 12 of the vehicle are connected in series-parallel relation, each comprising an armature winding 50 and a field winding 51. For effecting operation of the motors 12 to drive the vehicle there is provided a propulsion contactor relay 53, which when energized as hereinafter explained supplies current from a third rail shoe or trolley 55 to the motors by way of a circuit including a contact member 54, a conductor 56, the driving motors, a conductor 57, and a propulsion rheostat 58 connected to the ground at 59. It should be understood that suitable motor control equipment may be provided in addition to the rheostat 58 for governing operation of the motors.

The motors 12 are adapted to be disconnected from the power supply circuit and operated in a dynamic braking circuit to apply braking force to the vehicle. For this purpose there is provided a dynamic brake contactor relay 60, which when energized while the propulsion contactor 53 is deenergized is adapted to establish a circuit including a positive junction point 61 of the motor circuit, a conductor 62, a relay shunt 64, the contact member 63 of the dynamic brake relay, a dynamic brake rheostat 65, a conductor 66, and thence by way of a negative junction point 67 to the motor circuit. The dynamic brake rheostat 65 is of course operative to vary the resistance included in the dynamic braking circuit for providing the desired braking effect.

A spring brake release relay 70 is provided for controlling movement of the spring brake mechanism associated with each of the wheel and axle assemblies 11 from application to release position. With the spring brake mechanism in application position so that the contact members 44 and 45 are engaged as hereinafter explained, the spring brake release relay 70 may be energized to establish a circuit including the third rail shoe 55, a conductor 72, a contact element 73 of the relay 70, a conductor 74, and a release coil bus wire 75, the four connected pairs of contact members 44 and 45, and the respective release coils 35 which are connected to the ground at 77.

An auxiliary source of electrical energy, such as a battery 80, is provided for supplying current to energize the service holding coils 38 and the emergency holding coils 39 associated with the spring brake mechanisms of the four wheel and axle assemblies 11. As will hereinafter be more fully explained, the service holding coil circuit is controlled according to energization of a service holding relay 82, which controls a movable contact member 83. In like manner the emergency holding coil circuit is adapted to be controlled through the medium of a local emergency relay 84 which is adapted to actuate contact members 85, 86, 87 and 88. Both relays 82 and 84 have slow release characteristics. In addition, a spring brake suppression relay 90 for controlling movable contact members 91, 92 and 93 is provided for maintaining the service and emergency holding coils 38 and 39 energized when the dynamic brake apparatus is functioning to produce a predetermined braking effect, regardless of operation of the service holding relay 82 or the local emergency relay 84.

For controlling the various circuits for propulsion of the vehicle and for application of the brakes there is provided a controller device 100, which is shown in Fig. 4 in diagrammatic form only, and may have any suitable construction desired. As illustrated, the brake controller 100 may comprise a rotatable drum operative to any of four positions, namely, propulsion, coasting, service and emergency braking positions, for establishing various connections from a battery contact element 101 to one or more of a plurality of contact elements 102, 103, 104, 105 and 106. A deadman emergency switch 110 is associated with the brake and propulsion controller 100 for controlling a circuit including a master emergency relay 111, which, as hereinafter explained, must be maintained in energized condition while the vehicle is operated with the brakes released. The master emergency relay is adapted to control operation of a pair of movable contact members 112 and 113.

As hereinbefore explained, the brake controlling equipment disclosed in Fig. 4 is adapted to form part of the brake system for an entire train, the train brakes being under the control of the motorman operating the controller 100 at a control station located in the leading vehicle of the train. According to the invention the brake system is further adapted to effect an emergency application of the brakes in the event of accidental break-in-two of the train, or in response to operation of any of the conductor's emergency buttons located on separate vehicles. In order to provide these features the apparatus shown in Fig. 4 of the drawings includes a plurality of train line wires which are adapted to be suitably coupled at the ends of each vehicle and to extend throughout the train, and which are designated as a battery line 115, and emergency line 116, a service line 117, a release line 118, a dynamic brake control line 119, a propulsion line 120 and a conductor line 121. Suitable coupler mechanisms 123 may be provided at the opposite ends of each vehicle for connecting the train lines when the train is assembled. It will be noted that the coupler 123 on the last car of the train is adapted to be conditioned for connecting the battery line 115 by way of a conductor 124 to the conductor line 121.

*Operation*

When it is desired to condition the brake system for operation, the controller 100 is moved to coasting position, while the deadman switch 110 is closed and an emergency reset switch 125 is moved to its circuit closing position, whereupon the master emergency relay 111 is energized through a circuit including the positive terminal of the battery 80, a conductor 126, the rear coupler connection 123 including the conductor 124, the conductor train line 121, a normally closed conductor's emergency switch 128, one of which is provided on each vehicle, and further including a conductor 130, the reset switch 125, a conductor 131, the deadman switch 110, a conductor 132, the winding of the relay 111, a grounded connection 133 and a grounded negative terminal 134 of the battery. Upon energization of the master emergency relay 111, the movable contact member 113 is actuated for closing the circuit from the conductor 130 by way of a conductor 135 to the conductor 131 for shunting out the reset switch 125, which may then be released.

At the same time, the contact member 112 of the master emergency relay 111 is moved to its upper circuit closing position, so that the spring brake release relay 70 becomes energized by way of a circuit which includes the battery 80, the conductor 126, the battery train line 115, a conductor 140, the contactor member 112 of the relay 111, a supply conductor 141, the contact element 101 of the controller, a contact segment 143 thereof, the contact element 104, a conductor 144, the release line wire 118, a conductor 145, the contact member 93 of the suppression relay 90, which is at this time deenergized, and thence through a conductor 146 and the winding of the relay 70 to the ground at 147. With the spring brake release relay 70 thus energized from the battery, the contact member 73 thereof is moved to its circuit closing position for establishing a circuit hereinbefore described, through the medium of which the spring brake release coils 35 become energized, assuming that the spring brake mechanisms are initially in application position with the contact elements 44 and 45 engaged.

Meanwhile, both the service holding relay 82 and the local emergency relay 84 are energized for closing the energizing circuits of the various service and emergency coils 38 and 39. The local emergency relay 84 is energized through a circuit including the supply conductor 141, which as hereinbefore explained is at this time connected to the battery 80, the connected contact elements 101 and 102 of the controller, a conductor 150, the emergency line wire 116, a conductor 151, the winding of the relay and to the ground at 152. With the local emergency relay 84 thus energized, the emergency holding coils 39 become energized through a circuit including the battery, the conductor 126, the contact member 88 of the relay, and a conductor 154 leading to the four emergency holding coils, each of which is grounded at 155.

The circuit through which the service holding relay 82 is energized includes the supply conductor 141, the connected contact elements 101 and 103, a conductor 157, the service line wire 117, a conductor 158, the relay winding and a grounded conductor 159. The service holding relay 82 when energized completes a circuit which includes the battery 80, the conductor 126, the contact member 83 of the relay, a conductor 161, and the service holding coils 38, each of which is grounded as by a conductor 162.

Referring to Fig. 1, the release coil 35 of each brake mechanism on becoming energized effects movement of the brake rod 23 and the associated elements of brake mechanism to release position, whereupon the contact element 44 is disconnected from the contact element 45 to break the release coil circuit. In so moving, the brake rod 23 stretches the service spring 25 and actuates the spring casing 28 to compress the emergency spring 30, while the core portions 36 and 40 are substantially centered within the service coil 38 and emergency coil 39, respectively. Since the service and emergency coils are now energized, the brake rod 23 and other friction brake elements are maintained in their release position, although the release coil 35 has become deenergized.

With the brake and propulsion system thus conditioned for operation, the vehicle or train may be set in motion by movement of the controller 100 to propulsion position, in which the contact segment 143 bridges the contact elements 101, 102, 103, 104 and 106. The brake release holding circuits already described are thus maintained energized, while in addition, the propulsion contactor 53 is energized by means of a circuit including the supply conductor 141, the connected contact elements 101 and 106, a conductor 170, the propulsion line wire 120, a conductor 171, the contact member 86 of the local emergency relay 84, a conductor 172, the winding of the relay 53 and a grounded conductor 173. When the propulsion contactor relay 53 is energized, current is supplied for operating the driving motors 12 by way of the third rail shoe 55, the contact member 54 of the relay, the conductor 56, the armature and field windings of the motors, the conductor 57 and motor rheostat 58.

If it is desired to effect an application of the brakes, the controller 100 may be moved to service position wherein electrical connection is made between the contact elements 101, 102 and 105, while the contact elements 103, 104 and 106 are isolated. The propulsion contactor relay 53 is thereby deenergized for breaking the circuit from the power supply line to the motors 12, while the dynamic brake relay 60 becomes energized through the medium of a circuit including the supply conductor 141, the connected contact elements 101 and 105, a conductor 180, the dynamic brake line wire 119, a conductor 181, the contact member 87 of the local emergency relay, a conductor 182, the winding of the relay 60 and a grounded conductor 183. Since the armatures 50 of the motors 12 are at this time driven by the associated wheels 11 because of the momentum of the vehicle, the energization of the dynamic brake relay 60 renders the motor operative to effect dynamic braking as already explained.

Current flowing through the dynamic braking circuit also effects energization of the spring brake suppression relay 90 by way of a circuit including one terminal 185 of the relay shunt 64, a conductor 186, the winding of the suppression relay 90, a conductor 187, the contact member 85 of the local emergency relay 84, a conductor 188, and the other terminal 189 of the relay shunt 64. It will be noted that a relay resistor 190 is interposed between the conductors 187 and 188.

With the spring brake suppression relay 90 thus energized by current from the dynamic braking circuit, a suppression circuit is established for holding the service holding coils 38 energized independently of service holding relay 82, which suppression circuit includes the battery 80, the conductor 126, the contact member 91 of the suppression relay 90, and conductor 161 leading to the service magnets.

The service holding relay 82, which has a slow release characteristic, is meanwhile deenergized on movement of the controller 100 to service position, so that the contact member 83 of the service holding relay is dropped to its circuit opening position shortly after the dynamic braking current has been built up to energize the relay 90 as just explained.

It will be noted that, with the spring brake suppression relay 90 energized, the contact member 92 is disposed in circuit closing position for energizing the emergency holding coils 39 independently of the contact member 88 of the local emergency relay 84, and that the contact member 93 is held in its upper circuit closing position, so that the spring brake release relay 70 is still energized through a circuit including the battery 80, conductor 126, a conductor 193, the contact member 93 and conductor 146. Although the release coils 35 are at this time deenergized, since the friction brake mechanisms are held in release position under the magnetic pull of the emergency and release holding coils 39 and 38, it will be understood that in the event of accidental movement of any of the brake mechanisms to application position, the associated release coil 35 will immediately become energized and thus quickly return the brake mechanism to release position.

As the speed of the vehicle diminishes in response to operation of the motors 12 to effect dynamic braking, the motor current through the relay shunt 64 will eventually decrease below the drop-away value for the relay, whereupon the contact members 91 and 92 assume circuit opening position while the contact member 93 moves to its lower circuit closing position. This movement of the contact element 91 of the suppression relay 90 breaks the holding circuit for service holding coils 38, which are thus deenergized for permitting each of the service springs 25, see Fig. 1, to pull the brake rod 23 toward brake application position, the brake lever 16 being thereby operated in conjunction with the tie rod 20 and brake lever 17 to move the brake shoe elements 14 into braking relation with the wheel and axle assembly 11.

At the same time, the spring brake release relay 70 is deenergized by reason of the movement of the contact member 93 of suppression relay 90 to its lower position, it being remembered that the circuit including the release train line 118 is broken when the controller 100 is in service position. The release coils 35 therefore are deenergized during the operation of the friction brake mechanism to effect a service application of the brakes.

If it is desired to effect an emergency application of the brakes, the controller 100 is operated to emergency position in which the contact elements 102, 103 and 104 are isolated while the contact element 101 is connected to contact element 105. The dynamic braking circuit for energizing the dynamic brake relay 60 is thereby completed, so that the motors 12 are rendered operative to effect dynamic braking of the vehicle in the manner hereinbefore explained, while the spring brake suppression relay 90 is picked up by motor current in time to maintain closed the circuit for the service holding coils 38 and emergency holding coils 39, it being understood that the service holding relay 82 and local emergency relay 84 are at the same time deenergized but drop their contact members after an interval due to their slow release characteristics. Upon deenergization of the local emergency relay 84, the contact member 87 thereof assumes its lower circuit closing position for maintaining energized the dynamic brake relay 60 through a circuit including the battery 80, conductor 126, the contact member and conductor 182.

When the contact member 85 of the emergency relay is dropped to circuit opening position the circuit including the conductors 187 and 188 normally by-passing the relay resistor 190 is broken so that the resistor is inserted in the circuit for the spring brake suppression relay 90, thus requiring a higher motor current to sustain the relay. Consequently, as the speed of the vehicle is reduced, the diminishing of the motor current through the spring brake suppression relay 90 to the drop-away value thereof will occur while the vehicle is still traveling at a higher speed than would be the case during a service brake application as already explained. The dynamic braking effect of the motors is thus supplemented by the emergency braking force provided by the spring brake mechanisms while the vehicle is traveling at a relatively high speed.

It will be apparent that, upon deenergization of the spring brake suppression relay 90, the contact members 92 and 91 of the relay are dropped to their circuit opening position for cutting off supply of current to the several service holding coils 38 and emergency holding coils 39. Referring to Fig. 1, upon deenergization of the service and emergency coils both of the springs 25 and 30 are permitted to shift the brake rod 23 and associated friction brake elements to brake application position, the combined forces of the springs being thus effective to cause application of the maximum emergency braking force to the wheel and axle assembly 11.

An emergency application of the brakes may also be effected while the vehicle is traveling along the track by operation of either the conductor's emergency switch 128 on one of the cars of the train, or by release of the deadman emergency switch 110 at the forward control station. If either of these switches is moved to circuit opening position, the master emergency relay 111 becomes deenergized, and the contact member 112 thereof moves to its lower circuit closing position while the contact member 113 is dropped to circuit opening position. When the contact member 112 is thus operated the connection between the battery supply line 115 by way of the conductor 140 with the supply conductor 141 is broken, while the contact member closes the dynamic brake circuit previously traced, thus initiating operation of the motors to effect dynamic braking while conditioning the controlling relays for subsequent operation of the spring brake mechanism as hereinbefore explained. At the same time, since the circuit including the supply conductor 141 is isolated at the master emergency relay 111, the propulsion contactor relay 53 will be deenergized regardless of position of the controller 100.

From the foregoing description of my improved dynamic and automatic friction brake controlling system it will be apparent that I have provided a relatively simple and easily maintained electroresponsive brake equipment which may be employed for controlling either a single vehicle or a multiple-unit train, and which includes the safety features required for modern railway service.

While a preferred embodiment of the invention has been described, it is not my intention to limit the scope thereof to that embodiment or otherwise than by the terms of the appended claim.

Having now described my invention, what I claim as new and desire to secure by Letters Patent, is:

1. An electrically controlled brake system for a vehicle adapted for operation in a train, comprising motor means operable to generate current to effect dynamic braking, auxiliary friction brake means biased toward application position, electroresponsive holding means operative when energized to retain said friction brake means in release position, a main holding circuit including a train line conductor for normally energizing said holding means, a dynamic brake control circuit including another train line conductor for rendering said motor means operative to effect dynamic braking, control means for energizing said dynamic braking control circuit and for interrupting said main holding circuit, and means responsive to current produced during dynamic braking to establish an auxiliary holding circuit for energizing said holding means.

2. An electrically controlled brake system for a vehicle adapted for operation in a train, comprising motor means operable to generate current to effect dynamic braking, auxiliary friction brake means biased toward application position, electroresponsive holding means operative when energized to retain said brake means in release position, a main holding circuit including a train line conductor for normally energizing said holding means, a dynamic brake control circuit including another train line conductor for rendering said motor means operative to effect dynamic braking, control means for energizing said dynamic brake control circuit and for interrupting said main holding circuit, and a friction brake suppression relay operative by a predetermined current generated by said motor means during dynamic braking to establish an auxiliary holding circuit for energizing said holding means.

3. An electrically controlled brake system for a vehicle adapted for operation in a train, comprising motor means operable to generate current to effect dynamic braking, auxiliary friction brake means biased toward application position, holding relay means having a slow release characteristic and operative when energized to effect retention of said friction brake means in release position, a main holding circuit including a train line conductor for normally energizing said holding relay means, a dynamic brake control circuit including another train line conductor for rendering said motor means operative to effect dynamic braking, control means for simultaneously energizing said dynamic brake control circuit while interrupting said main holding circuit, and a friction brake suppression relay operative by a predetermined current generated by said motor means during dynamic braking to establish an auxiliary holding circuit for continuing retention of said friction brake means in release position upon deenergization of said holding relay means.

4. An electrically controlled brake system for a vehicle adapted for operation in a train, comprising motor means operable to generate current to effect dynamic braking, auxiliary friction brake means biased toward application position, electroresponsive holding means operative when energized to retain said friction brake means in release position, a main holding circuit including a train line conductor for normally energizing said holding means, a dynamic brake control circuit including another train line conductor for rendering said motor means operative to effect dynamic braking, and means operative in response to interruption of said main holding circuit for energizing said dynamic brake control circuit.

5. In an electric brake system for a vehicle in a train, in combination, dynamic brake means, a dynamic brake relay operative when energized to cause dynamic braking, a circuit including a dynamic brake control line extending throughout the train for energizing said dynamic brake relay, emergency friction brake means normally biased toward application position, holding magnet means for retaining said friction brake means in release position, a battery, and a local emergency relay operative when energized to supply current from said battery to said holding magnet means and adapted when deenergized to interrupt said magnet circuit and said train line circuit while establishing a circuit between said magnet and said dynamic brake relay, thereby effecting simultaneous application of said dynamic brake means and said friction brake means.

6. In a control system in a train, in combination, motor means for each vehicle in the train operable either for propulsion or for dynamic braking, a propulsion relay for each vehicle operative when energized to connect the associated motor means for propulsion, a dynamic brake relay upon each vehicle operative when energized to cause dynamic braking, friction brake means for each vehicle normally biased toward brake application position, holding relay means operative when energized to retain said friction brake means in release position, and controller means carried on one of the vehicles in the train and operative at one time to effect energization of said propulsion relay and said holding relay on all vehicles of said train, and at another time to effect energization of said dynamic brake relay while causing deenergization of said propulsion and holding relays throughout the train.

7. In a brake and propulsion control equipment for a vehicle adapted for operation in a train, in combination, driving motor means, a propulsion relay circuit therefor, a dynamic brake relay operative to convert said motor means for dynamic braking, a service dynamic brake control circuit for energizing said dynamic brake relay, spring brake means, a normally energized emergency relay operative on deenergization to effect application of said spring brake means and to interrupt said propulsion relay circuit, controller means having one position for energizing said propulsion relay circuit and the circuit for said emergency relay, and having another position for energizing said service dynamic brake control circuit, emergency switch means operable to interrupt the circuit for said emergency relay, and an emergency circuit established upon deenergization of said emergency relay for energizing said dynamic brake relay regardless of the position of said controller means.

8. In a brake system for a motor driven vehicle adapted for operation in a train, in combination, a dynamic brake relay operative to convert the vehicle motor means for dynamic braking, service spring brake means, emergency spring brake means, normally energized service holding relay means for effecting retention of said service spring brake means in release position, normally energized emergency holding relay means for effecting retention of said emergency spring brake means in release position, suppression relay means temporarily energized by a predetermined dynamic braking current to effect retention of both spring brake means in release position, an emergency circuit established on deenergization of said emergency holding relay means for energizing said dynamic brake relay, and master control means operative to effect a service application of the brakes by energizing said dynamic brake relay while deenergizing said service holding relay means, and operative to effect an emergency application of the brakes by energizing said dynamic brake relay while deenergizing both said service and emergency holding relay means.

9. In a brake system for a motor driven vehicle adapted for operation in a train, in combination, a dynamic brake relay operative to convert the vehicle motor means for dynamic braking, service spring brake means, emergency spring brake means, normally energized service holding relay means for effecting retention of said service spring brake means in release position, normally energized emergency holding relay means for effecting retention of said emergency spring brake means in release position, suppression relay means temporarily energized by a predetermined dynamic braking current to effect retention of both spring brake means in release position, an emergency circuit established on deenergization of said emergency holding relay means for energizing said dynamic brake relay, master control means operative to effect a service application of the brakes by energizing said dynamic brake relay while deenergizing said service holding relay means, and operative to effect an emergency application by energizing said dynamic brake relay while deenergizing both said service and emergency holding relay means, and emergency switch means independently operative to interrupt said service and emergency relay circuits while establishing a shunt circuit around said controller means for energizing said dynamic brake relay.

10. In a brake equipment for a vehicle adapted for operation in a train, in combination, dynamic brake means, dynamic brake relay means for rendering said dynamic brake operative, spring brake means biased toward application position, release magnet means operative when energized to move said spring brake means from application position to release position, holding magnet means for retaining said spring brake means in release position, slow release holding relay means for energizing said holding magnet means, a release relay controlling a circuit for supply of current to said release magnet means, switch means operable by said spring brake means in approaching release position to interrupt said circuit, a controller device operative to effect application of the brakes by effecting energization of said dynamic brake relay means and deenergization of said holding relay means and said release relay, and spring brake suppression relay means responsive to a predetermined current generated by said dynamic brake means for continuing energization of said release relay means and said holding magnet means.

11. In a control system in a train, in combination, motor means for each vehicle in the train operable either for propulsion or for dynamic braking, a propulsion relay for each vehicle operative when energized to connect the associated motor means for propulsion, a dynamic brake relay upon each vehicle operative when energized to cause dynamic braking, friction brake means for each vehicle normally biased toward brake application position, holding relay means operative when energized to retain said friction brake means in release position, and circuit means arranged so that both of said propulsion and dynamic brake relays are controlled by said holding relay means.

JOHN W. LOGAN, Jr.